Patented Aug. 18, 1936

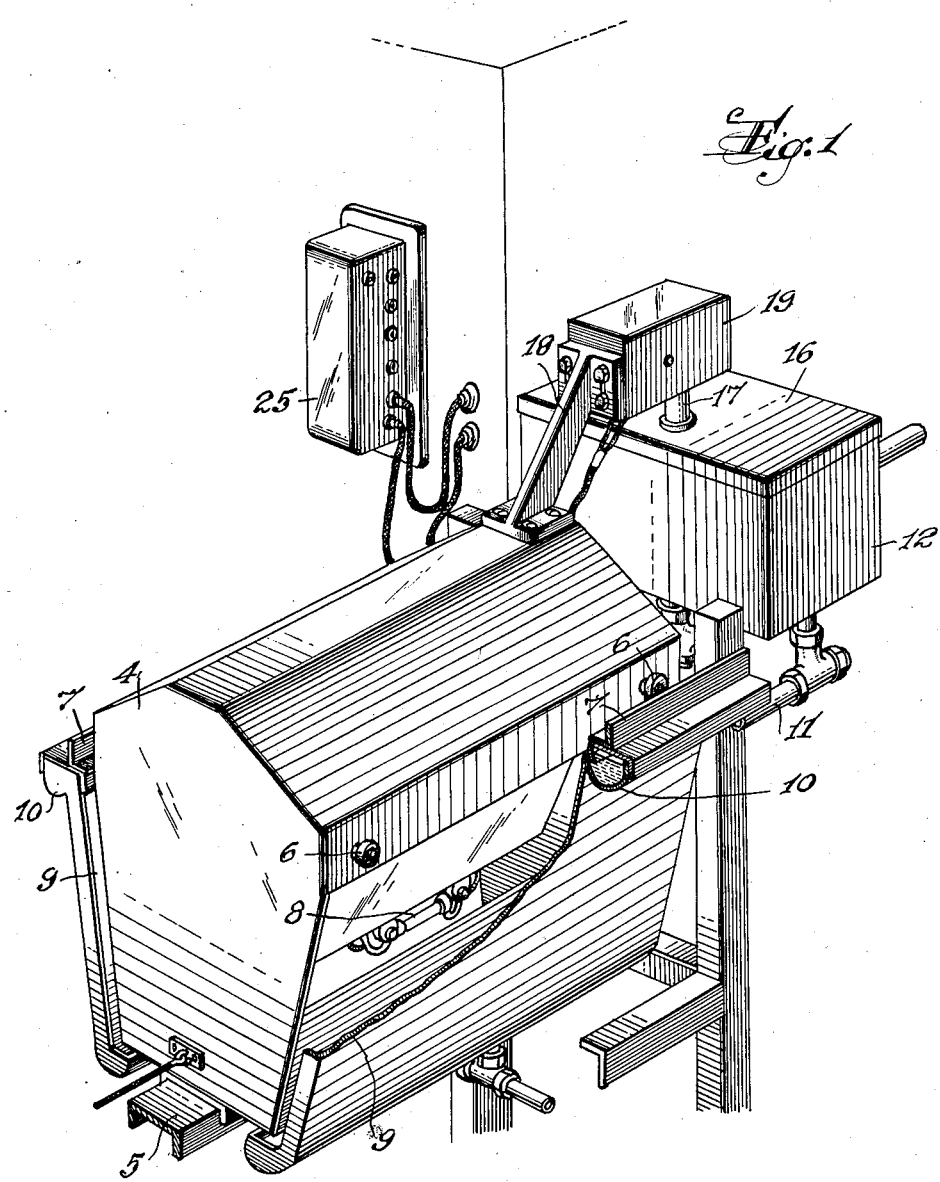

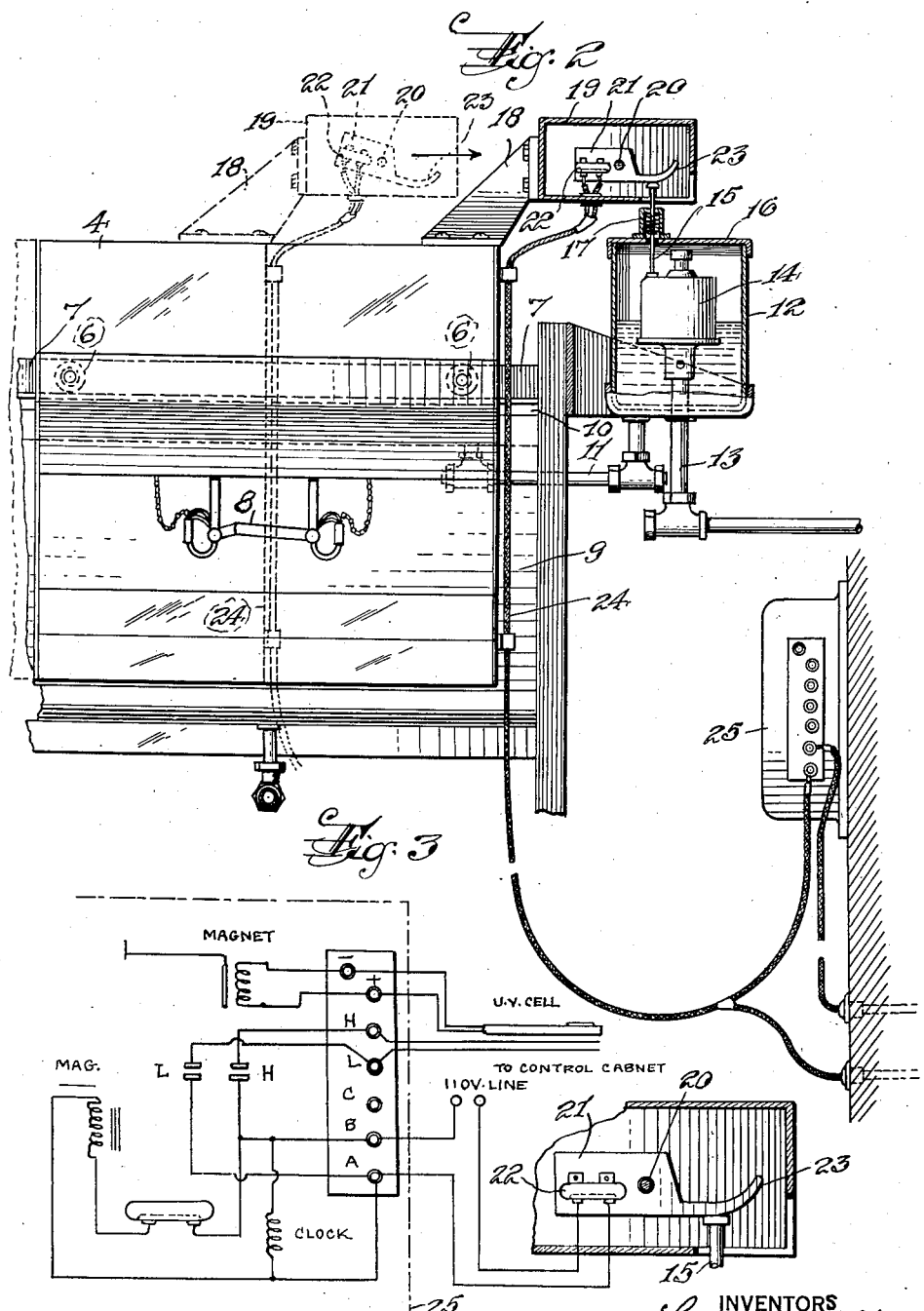

2,051,395

UNITED STATES PATENT OFFICE 2,051,395

APPARATUS FOR IRRADIATING LIQUIDS

Frederic William Robinson, Short Hills, and Carl Johan Larsen, East Orange, N. J., assignors to Hanovia Chemical and Manufacturing Company, Newark, N. J., a corporation of New Jersey Application December 27, 1934, Serial No. 759,326

3 Claims. (Cl. 99—248)

This invention relates to improvements in apparatus for irradiating milk and other liquids with ultraviolet rays, and more particularly to means for indicating when the apparatus is not functioning properly.

In an apparatus for irradiating milk and the like with ultraviolet rays, there is provided a movable carriage upon which is mounted a source of ultraviolet rays, generally in the form of a mercury vapor lamp with a quartz envelope. This carriage is movable into a position between inclined surfaces over which milk or other liquid is caused to flow. For the proper irradiation of milk it is necessary that the intensity of the ultraviolet rays be of a predetermined value and that the milk flow at a predetermined rate. Usually the flow of the milk is controlled by a float valve which automatically allows more milk to flow into a small reservoir when the milk therein falls to a predetermined level. Should the carriage be not moved to the proper position between the inclined surfaces over which the milk flows, the ultraviolet rays emitted from the mercury vapor lamp will not irradiate the milk with the proper intensity.

It is also desirable to have an accurate indication or record to indicate that the milk or other liquid is flowing at full velocity and that during that time the ultraviolet radiations from the lamp were falling upon the liquid surface being irradiated. This is a necessary precaution against careless and improper manipulation of the apparatus.

It is an object of this invention to provide a device in the form of a switch in combination with the float valve controlling the flow of milk, which automatically interrupts the operation of a recording meter when the carriage is not properly positioned between the surfaces over which the milk flows, or when the flow of milk has ceased or is not at full velocity.

The recording meter generally is provided with some sort of a signalling device, such as a bell, siren, or other sound producing devices or a visual signal in the form of a flashing incandescent lamp.

A further object of the invention is to provide means to insure that the record formed on a recording ultraviolet meter was obtained at a time when the milk or other liquid was flowing at full velocity, and that during such time, the source of ultraviolet was properly positioned relative to the surfaces over which milk flows so that the irradiation was performed with ultraviolet rays of the predetermined intensity.

These and other advantageous objects, which will later appear, are accomplished by the simple and practical construction and arrangement of parts hereinafter described and exhibited in the accompanying drawings, forming part hereof, and in which:

Fig. 1 is a perspective view of an apparatus for irradiating liquids embodying my invention, Fig. 2 is an elevational view, partly in section, of the liquid irradiating apparatus, and Fig. 3 is a schematic wiring diagram of the recording meter used in connection with the apparatus.

Referring to the drawings, the apparatus is shown to comprise a carriage 4 which is slidable upon a guide rail 5 and has rollers 6 riding on an angle guide rail 7. Supported in a predetermined position by the carriage is a mercury vapor lamp 8 having a quartz envelope. As shown in Fig. 1, the carriage is positioned for proper irradiation of liquids which flow over the inclined surfaces 9. The upper edge of each inclined surface 9 is provided with a trough 10 which receives milk through a pipe 11 from a reservoir 12. The milk or other liquid enters the reservoir by means of pipes 13 and the flow of the liquid is controlled by a float valve 14 of a suitable type. A push rod 15 rests upon the float 14 and passes through the cover 16 of the reservoir and through a guide member 17 mounted on the cover 16.

Rigidly mounted upon the carriage 4 by means of brackets 18 is a housing 19 in which is pivotally mounted at 20 an arm 21 having mounted thereon a mercury switch 22. The arm 21 is provided with an arcuate lip 23 which engages the push rod 15.

When the liquid is at the proper level in the reservoir and the carriage is in the proper position between the surfaces 9, the push rod 15 will engage the lip 23 in a manner to move the arm 21 to a substantially horizontal position so that there is an electrical connection between the two terminals of the mercury switch. A lead wire 24 connects the mercury switch 22 with a recording meter generally indicated at 25.

In operation, the mercury vapor lamp is started and brought up to the required intensity with the carriage moved to a position out from between the surfaces 9. This is desirable so that the ozone generated during the initial starting of the mercury vapor lamp will have no tendency to contaminate the milk or other liquids being irradiated. When the ultraviolet radiations have reached the desired intensity, the carriage 4 is moved to a position between the inclined surfaces 9. It is necessary that the carriage be moved to a predetermined position for proper irradiation; that is, merely moving the carriage half-ways or three-quarters of the way in between the surfaces 9 would be insufficient. In order to indicate when the carriage has not been properly positioned between the surfaces 9, the arm 21 will tilt downwardly as indicated in dotted lines in Fig. 2 to open the mercury switch 22 and stop the recording of the meter 25, and at the same time produce an audible or visual signal. While there have not been shown in the drawings, devices for producing such signals, it is obvious that any of the well known types of bells, sirens, lamps or the like can be used.

When the milk in the reservoir 12 falls below a predetermined level, which obviously will affect the rate of flow of the liquid over the surfaces 9, the float valve falls and carries with it the push rod 15 so that the arm 21 will tilt downwardly as shown in dotted lines to also interrupt the recording of the meter 25 and produce a warning signal.

From the above description it will be seen that we have provided a simple and effective device for stopping the continuous record of a recording meter or for producing an audible or visual signal, to indicate when the liquid being irradiated is not flowing at the proper rate or has ceased to flow, or when the carriage upon which the source of ultra-violet rays is mounted is not properly positioned to cause the ultraviolet rays to irradiate the liquid to proper intensity. Apparently, our improvement is a safeguard against carelessness on the part of operators; and it also prevents the possibility of the distribution of milk or other liquids which have been inadvertently irradiated by means of ultraviolet rays of improper intensity.

The foregoing disclosure is to be regarded as descriptive and illustrative only, and not as restrictive or limitative of the invention, of which obviously an embodiment may be constructed including many modifications, without departing from the general scope herein indicated and denoted in the appended claims.

Having thus described our invention, what we claim as new and desire to secure by Letters Patent, is:

1. In an apparatus for irradiating liquids with ultraviolet rays, a movable carriage, a source of ultraviolet rays mounted on said carriage, surfaces over which the liquid being irradiated is caused to flow, a reservoir for said liquid, means to distribute liquid from the reservoir to said surfaces, a float valve controlling the flow of liquid into the reservoir, a meter for recording the flow of liquid, a mercury switch controlling said recording meter, an arm upon which said mercury switch is mounted, a bracket secured to the carriage and carrying a housing in which the said arm is pivotally mounted, a push rod connected to said float valve and adapted to engage said arm to move the arm to a position to close the mercury switch when the carriage is properly positioned relative to said surface and the liquid is flowing at the proper velocity over said surfaces.

2. In an apparatus for irradiating liquids with ultraviolet rays, a movable carriage, a source of ultraviolet rays mounted on said carriage, surfaces over which the liquid being irradiated is caused to flow, a reservoir for said liquid, means to distribute liquid from the reservoir to said surfaces, a float valve controlling the flow of liquid into the reservoir, a meter for recording the flow of liquid, a mercury switch controlling said recording meter, and means controlled by the position of the float valve to open said mercury switch when the liquid is not flowing over said surfaces at the proper velocity.

3. In an apparatus for irradiating liquids with ultraviolet rays, a movable carriage, a source of ultraviolet rays mounted on said carriage, surfaces over which the liquid being irradiated is caused to flow, a reservoir for said liquid, means to distribute liquid from the reservoir to said surfaces, a float valve controlling the flow of liquid into the reservoir, a meter for recording the flow of liquid, a mercury switch controlling said recording meter, and means controlled by the float valve to close said mercury switch only when the carriage is properly positioned relative to the surfaces over which the liquid flows.

FREDERIC W. ROBINSON.
CARL JOHAN LARSEN.